US012705008B2

(12) United States Patent
Yuan et al.

(10) Patent No.: US 12,705,008 B2
(45) Date of Patent: Aug. 11, 2026

(54) CONTROL METHOD, APPARATUS, AND ELECTRONIC DEVICE

(71) Applicant: Lenovo (Beijing) Limited, Beijing (CN)

(72) Inventors: Li Yuan, Beijing (CN); Jinshan Chen, Beijing (CN)

(73) Assignee: LENOVO (BEIJING) LIMITED, Beijing (CN)

( * ) Notice: Subject to any disclaimer, the term of this patent is extended or adjusted under 35 U.S.C. 154(b) by 0 days.

(21) Appl. No.: 18/233,776

(22) Filed: Aug. 14, 2023

(65) Prior Publication Data

US 2024/0078068 A1 Mar. 7, 2024

(30) Foreign Application Priority Data

Sep. 7, 2022 (CN) ......................... 202211088656.4

(51) Int. Cl.
*G06F 3/14* (2006.01)
*G09G 5/391* (2006.01)

(52) U.S. Cl.
CPC ............... *G06F 3/14* (2013.01); *G09G 5/391* (2013.01); *G09G 2320/0686* (2013.01); *G09G 2340/0407* (2013.01)

(58) Field of Classification Search
CPC ........... G09G 2320/0686; G09G 5/391; G09G 2340/0407; G06F 3/14
See application file for complete search history.

(56) References Cited

U.S. PATENT DOCUMENTS

| | | | | |
|---|---|---|---|---|
| 6,839,061 | B1 * | 1/2005 | Kamakura ............ | G06F 3/1446 345/903 |
| 2006/0045550 | A1 * | 3/2006 | Oyama ................ | G03G 15/205 399/33 |
| 2006/0203001 | A1 * | 9/2006 | Van Der Stok ........ | H04N 21/47 345/562 |
| 2008/0079736 | A1 * | 4/2008 | Maass .................... | G09G 5/363 345/505 |
| 2019/0147792 | A1 * | 5/2019 | Kim ..................... | G09G 3/3225 345/694 |
| 2020/0004319 | A1 * | 1/2020 | Mizuno ................ | G09G 3/3406 |
| 2022/0319388 | A1 * | 10/2022 | Xian ..................... | G06F 3/1438 |
| 2024/0078068 | A1 * | 3/2024 | Yuan ......................... | G06F 3/14 |

FOREIGN PATENT DOCUMENTS

| | | | | |
|---|---|---|---|---|
| CN | 103067721 A | * | 4/2013 | |
| CN | 113110906 | * | 7/2021 | ............. G06F 9/451 |
| CN | 113110906 A | * | 7/2021 | ........... G06F 3/1423 |

* cited by examiner

*Primary Examiner* — Yuzhen Shen
(74) *Attorney, Agent, or Firm* — ANOVA LAW GROUP, PLLC

(57) ABSTRACT

A control method includes, in response to an electronic device entering a target mode, controlling at least two processing units to process display content for one or more display output areas to obtain processing results, and outputting the processing results to the one or more display output areas.

16 Claims, 8 Drawing Sheets

(a)

Smart casting
HDMI
Main screen area
dGPU
HDMI
Scalar chip
eDP
4K Panel
PCIE 8X
DP
eDP
iGPU
Type-C in
External dGPU
Secondary screen area (b)

CONTROL METHOD, APPARATUS, AND ELECTRONIC DEVICE

CROSS-REFERENCE TO RELATED APPLICATION

This application claims priority to Chinese Patent Application No. 202211088656.4, filed on Sep. 7, 2022, the entire content of which is incorporated herein by reference.

TECHNICAL FIELD

The present disclosure relates to the technical field of display and, more particularly, to a control method, apparatus, and electronic device.

BACKGROUND

At present, when an electronic device is integrated with a processing unit related to display processing but the processing unit cannot bring a better display effect, the electronic device is generally additionally equipped with an independent processing unit for all display processing of the electronic device.

However, this will cause the electronic device not to utilize the integrated processing unit, which results in waste of resources of the electronic device.

SUMMARY

In accordance with the disclosure, there is provided a control method including, in response to an electronic device entering a target mode, controlling at least two processing units to process display content for one or more display output areas to obtain processing results, and outputting the processing results to the one or more display output areas.

Also in accordance with the disclosure, there is provided an electronic device including a display controller configured to determine at least two processing units corresponding to one or more display output areas of the electronic device in response to the electronic device entering a target mode, and a central processing unit configured to send display content for the one or more display areas to the at least two processing units. The display controller is further configured to receive processing results obtained by the at least two processing units processing the display content, and output the processing results to the one or more display output areas.

BRIEF DESCRIPTION OF THE DRAWINGS

In order to explain the embodiments of the present disclosure more clearly, reference is made to the accompanying drawings, which are used in the description of the embodiments. Obviously, the drawings in the following description are only some embodiments of the present disclosure, and other drawings can be obtained from these drawings without any inventive effort for those of ordinary skill in the art.

DETAILED DESCRIPTION OF THE EMBODIMENTS

The technical solutions in the embodiments of the present disclosure will be described in detail with reference to the accompanying drawings. Obviously, the described embodiments are only some of rather than all the embodiments of the present disclosure. Based on the described embodiments, all other embodiments obtained by those of ordinary skill in the art without inventive effort shall fall within the scope of the present disclosure.

In order to make the above objectives, features, and advantages of the present disclosure more obvious and understandable, the present disclosure will be further described in detail below with reference to the accompanying drawings and example embodiments.

Figure 1:
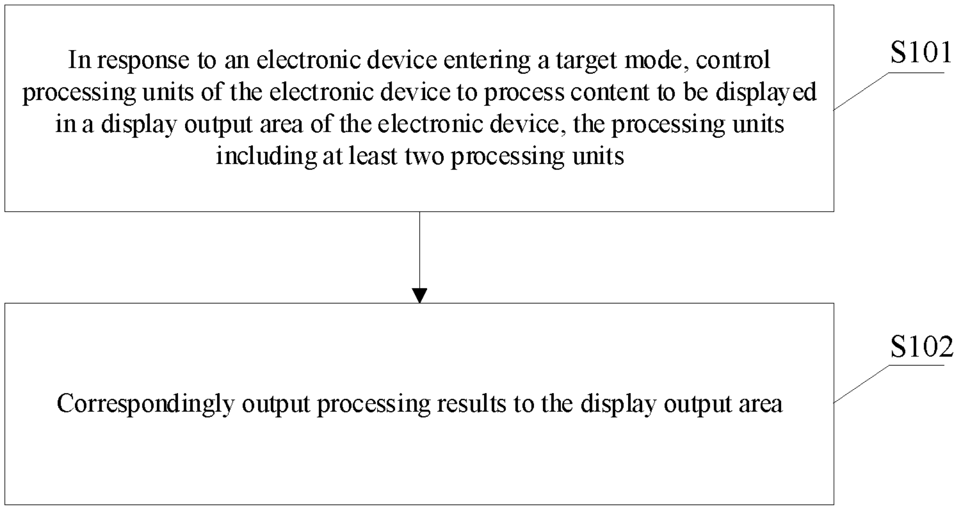
FIG. 1 is a schematic flowchart of a control method according to an example embodiment of the present disclosure.

FIG. 1 is a schematic flowchart of a control method according to an example embodiment of the present disclosure. As shown in FIG. 1, the method includes but is not limited to the following processes.

Process S101, in response to an electronic device entering a target mode, controlling processing units of the electronic device to process content to be displayed (also referred to as "display content") in a display output area of the electronic device, the processing units including at least two processing units.

In some embodiments, the processing units of the electronic device may include at least two processing units, and the processing units at least have a display processing function. Types of the processing units are not limited in the present disclosure. For example, the processing units may include but are not limited to dedicated graphics processing units (dGPU), integrated graphics processing units (iGPU), vector processing units (VPU), neural-network processing units (NPU), or tensor processing units (TPU).

In some embodiments, in response to the electronic device entering the target mode, the processing units of the electronic device may be controlled to process the content to be displayed in the display output area of the electronic device corresponding to the target mode. In different target modes, corresponding control parameters of the processing units are different. In the corresponding target mode, the processing units perform corresponding processing on the content to be displayed in the display output area of the electronic device based on the corresponding control parameters.

The processing units may or may not belong to the electronic device. The processing units that do not belong to the electronic device may be used by the electronic device.

For example, the processing units that belong to the electronic device may include, but are not limited to, iGPU or built-in dGPU in the electronic device; the processing units that do not belong to the electronic device may include, but are not limited to, external dGPU of the electronic device, which can be connected to the electronic device through an interface of the electronic device, so as to be used by the electronic device.

In some embodiments, the display output area may be unique (i.e., there is only one display output area) or may be not unique (i.e., there are a plurality of display output areas).

When the display output area is not unique, there can be at least two display output areas, which may both belong to the electronic device. It may also be that one or more of the at least two display output areas belong to the electronic device, and another one or more of the at least two display output areas do not belong to the electronic device. For example, the at least two display output areas include a first display output area of a display screen in the electronic device and a second display output area of an external display screen of the electronic device.

Process S102, correspondingly outputting processing results to the display output area.

Corresponding to the embodiments in which the display output area is unique, the process may include outputting the processing results to the unique display output area.

Corresponding to the embodiments in which the display output area is not unique, the process may include outputting processing results obtained by processing content to be displayed in each display output area to the corresponding display output area. For example, at least two display output areas include the first display output area and the second display output area. Correspondingly, first processing results obtained by processing the content to be displayed in the first display output area are output to the first display output area, and second processing results obtained by processing the content to be displayed in the second display output area are output to the second display output area.

In some embodiments, in response to the electronic device entering the target mode, the processing units of the electronic device are controlled to process the content to be displayed in the display output area of the electronic device, where the processing units include at least two processing units. The processing results are correspondingly output to the display output area. In this way, the at least two processing units of the electronic device are fully utilized to process the content to be displayed, which can reduce waste of resources of the electronic device, enhance image output quality and efficiency, avoid time delay, etc.

Figure 2:
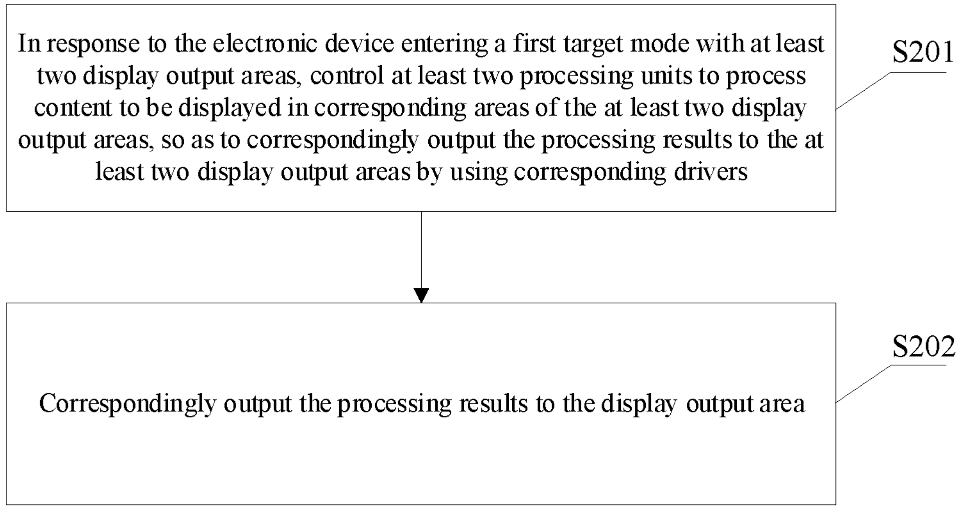
FIG. 2 is a schematic flowchart of a control method according to another example embodiment of the present disclosure.

FIG. 2 is a schematic flowchart of a control method according to another example embodiment of the present disclosure, which is mainly a refinement of the control method described in the above embodiments. As shown in FIG. 2, the method includes but is not limited to the following processes.

Process S201, in response to the electronic device entering a first target mode with at least two display output areas, controlling at least two processing units to process the content to be displayed in the corresponding areas of the at least two display output areas, so as to correspondingly output the processing results to the at least two display output areas by using corresponding drivers.

In some embodiments, the electronic device can automatically enter the first target mode with at least two display output areas when set conditions are met.

In some other embodiments, the electronic device may also enter the first target mode with at least two display output areas in response to a trigger event. The trigger event may be, but is not limited to be, generated when a user splits the display output area of the display screen based on an osd menu provided by a display controller of the display screen, or generated when a mode switch is triggered by a physical button provided at the electronic device.

Corresponding to the embodiments in which the electronic device enters the first target mode with at least two display output areas in response to the trigger event, a processor of the electronic device, such as the display controller or a central processing unit (CPU), may determine the processing units corresponding to each display output area. Correspondingly, the central processing unit may send the content to be displayed in the display output area to the corresponding processing units, and the corresponding processing units may process the content to be displayed.

In some embodiments, the at least two display output areas may both belong to the electronic device. For example, the at least two display output areas may be at least two split-screen areas obtained by splitting the display output area of the display screen in the electronic device.

In some other embodiments, one or more of the at least two display output areas belong to the electronic device, and another one or more of the at least two display output areas do not belong to the electronic device. For example, the at least two display output areas include the first display output area of the display screen in the electronic device and the second display output area of the external display screen of the electronic device; or the first display output area of the display screen in the electronic device and a screen projection area of a screen projection device corresponding to the electronic device; or the first display output area and the second display output area corresponding to a first display screen and a second display screen configured at the electronic device.

A correspondence relationship between the processing units and the display output areas is not limited in the present disclosure. For example, there is a one-to-one correspondence relationship between the processing units and the display output areas, i.e., one processing unit corresponds to one display output area, and the display output areas corresponding to each processing unit are different; or, there is a one-to-many correspondence relationship between the processing units and the display output areas, i.e., one processing unit may correspond to at least two display output areas, and content to be displayed in the at least two display output areas is processed by one corresponding processing unit; or, there is a many-to-one correspondence relationship between the processing units and the display output areas, i.e., at least two processing units correspond to one display output area, and content to be displayed in the one display output area is jointly processed by at least two processing units.

For example, based on the correspondence relationship between the processing units and the display output areas, at least two processing units are controlled to process content to be displayed in corresponding areas in at least two display output areas.

In some embodiments, one processing unis corresponds to one driver, and the processing unit can use the driver to communicate with the display controller (such as a scalar chip) of the display screen. The driver sends the processing results to the display controller, so that the display controller can decode the processing results, and a display driver can drive a display circuit corresponding to the display output areas to display decoded content.

Controlling the at least two processing units to process the content to be displayed in the corresponding areas of the at least two display output areas in response to the electronic device entering the first target mode with at least two display output areas may include, but is not limited to, at least one of the following processes.

S2011, in response to the display screen of the electronic device entering a split-screen mode, controlling at least two processing units to process content to be displayed in corresponding areas in at least two split-screen areas at least based on split-screen information of the display screen.

Figure 3:
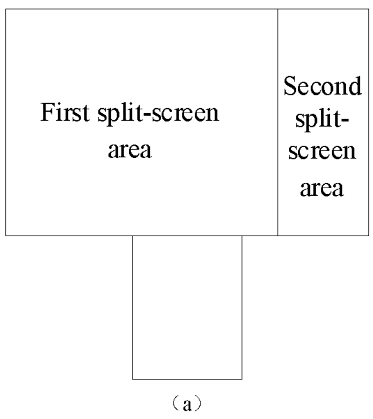
FIG. 3 is a schematic diagram showing split-screen areas according to an embodiment of the present disclosure.
Figure 3:
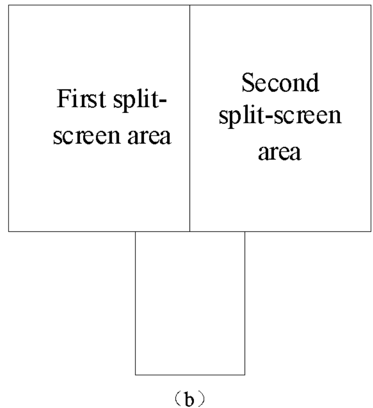
Figure 3:
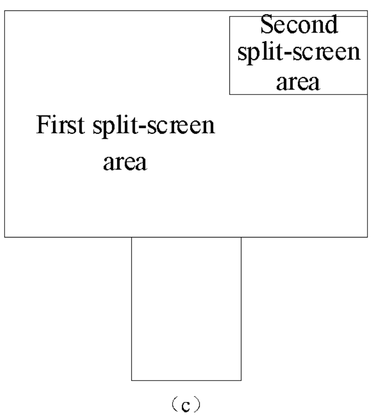

The split-screen mode may be a split-screen mode according to a set split-screen ratio, and correspondingly, the at least two split-screen areas may be obtained by splitting the display area of the display screen according to the set split-screen ratio. For example, as shown in part (a) of FIG. 3, the display area of the display screen is split into a first split-screen area and a second split-screen area at a ratio of 3:1. As another example, as shown in part (b) of FIG. 3, the display area of the display screen is split into the first split-screen area and the second split-screen area at a ratio of 1:1.

The split-screen mode may also be a picture-in-picture split-screen mode, and correspondingly, one or more split-screen areas in the at least two split-screen areas are suspended on other split-screen areas in a form of small windows. For example, as shown in part (c) of FIG. 3, the second split-screen area is suspended on the first split-screen area in the form of a small window.

The content to be displayed in the corresponding areas of the at least two split-screen areas may be different, and correspondingly, the processing units corresponding to the split-screen area may process the corresponding content to be displayed. The content to be displayed may be provided according to scenarios. For example, the content to be displayed in each split-screen area is configured in the following scenarios.

In scenario one, the at least two processing units of the electronic device include a discrete graphics card and an integrated graphics card integrated in the CPU. When the electronic device uses the discrete graphics card to perform display processing related to a first display task (e.g., a rendering design task of a first object), the user needs to use the integrated graphics card integrated in the CPU to perform display processing related to a second display task (e.g., a rendering design task of a second object). A processing power resource needed for the rendering design task of the first object is higher than a processing power resource needed for the rendering design task of the second object.

In scenario one, the content to be displayed in the first split-screen area corresponding to the discrete graphics card is the content to be displayed related to the rendering design task of the first object, and the content to be displayed in the second split-screen area corresponding to the integrated graphics card integrated in the CPU is the content to be displayed related to the rendering design task of the second object.

In scenario two, the at least two processing units of the electronic device include the discrete graphics card and the integrated graphics card integrated in the CPU. When the electronic device uses the discrete graphics card to perform rendering design of the first object, the user needs to use the integrated graphics card integrated in the CPU to perform display output processing associated with a display job that is different from the rendering design.

In scenario two, the content to be displayed in the first split-screen area corresponding to the discrete graphics card is the content to be displayed of the rendering design of the first object, and the content to be displayed in the second split-screen area corresponding to the integrated graphics card integrated in the CPU is the content to be displayed different from the rendering design (such as key points related to the rendering design, design templates, etc.).

In process S2011, if it is determined that the display screen of the electronic device enters the split-screen mode, at least one of the split-screen information of the display screen, configuration information of the processing units, or the content to be displayed in each split-screen area can be obtained. The display screen of the electronic device enters the split-screen mode, and the display screen of the electronic device includes at least two split-screen areas.

Controlling at least two processing units to process the content to be displayed in the corresponding areas in the at least two split-screen areas at least based on the split-screen information of the display screen may include at least one of the following processes.

S20111, determining the processing units corresponding to each split-screen area based on the split-screen information, so as to use the processing units to process the content to be displayed in the corresponding split-screen area.

The split-screen information of the display screen can at least be used to determine that the display screen of the electronic device includes at least two split-screen areas. For example, the split-screen information of the display screen may include, but is not limited to, at least one of number and size ratio relationship of the at least two split-screen areas or properties of the split-screen areas set by the user. The properties of the split-screen areas set by the user may represent a main screen area or a secondary screen area of the split-screen areas.

For example, determining the processing units corresponding to each split-screen area based on the split-screen information may include, but is not limited to, at least one of the following processes.

Determining at least two processing units based on the number of the at least two split-screen areas, where number of the at least two processing units is consistent with the number of the at least two split-screen areas, and each split-screen area corresponds to one processing unit; determining size of each split-screen area based on the size ratio relationship of the at least two split-screen areas, and determining the processing unit for the split-screen area based on the size of the split-screen area.

Determining the processing unit of a type corresponding to the properties as the processing unit corresponding to the split-screen area based on the properties of the split-screen areas set by the user, where a correspondence relationship between the properties of the split-screen areas and the types of the processing units can be preset.

The user can split the display output area of the display screen into at least two split-screen areas based on the osd menu, and set the properties of each split-screen area. For example, if the screen is split into two split-screen areas, the properties of the two split-screen areas are respectively set as a main screen and a secondary screen. The processing units of the electronic device include dGPU and iGPU, and the display controller (such as the scalar chip) may determine that the main screen area corresponds to the dGPU and the secondary screen area corresponds to the iGPU when it is determined that an external interface (Type-c in) is in a first state.

Figure 4:
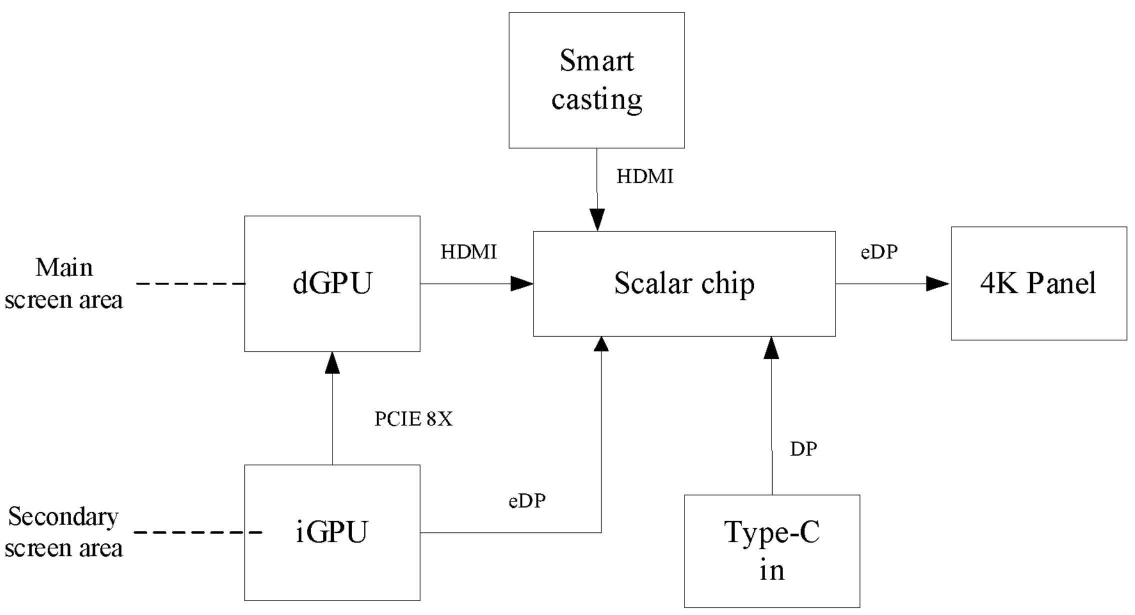
FIG. 4 is a schematic diagram showing an implementation scenario of a control method according to an example embodiment of the present disclosure.

When it is determined that the main screen area corresponds to the dGPU and the secondary screen area corresponds to the iGPU, as shown in FIG. 4, the dGPU process content to be displayed in the main screen area, and the iGPU process content to be displayed in the secondary screen area. The dGPU and iGPU respectively use the driver to send the processing results to the scalar chip. The scalar chip decodes the processing results, and the display driver drives the display circuit corresponding to the display output areas to display the decoded content (such as 4 k panel). FIG. 4 only shows an example, and is not intended as a limitation to an interaction process of the processing units. A transmission protocol such as DP, eDP, PCIE 8X, or HDMI in FIG. 4 is only one of the transmission protocols, and is not intended as a limitation to the transmission protocols.

The secondary screen area corresponds to the iGPU, and the iGPU is independently used in the secondary screen area. The main screen area corresponds to the dGPU, and the dGPU is independently used in the main screen area. Units other than the iGPU and dGPU in the electronic device (such as memory, SSD\HDD, or an external unit such as speaker, mic, or camera) can be shared by the main screen area and the secondary screen area.

Based on the split-screen information of the display screen and that the display screen of the electronic device includes at least two split-screen areas, a correspondence relationship between the split-screen areas and the processing units may be determined based on the split-screen information, and the at least two processing units are controlled to process the content to be displayed in the corresponding areas in the at least two split-screen areas based on the correspondence relationship between the split-screen areas and the processing units.

The correspondence relationship between the split-screen areas and the processing units may include, but is not limited to, that there is a one-to-one correspondence relationship between the processing units and the split-screen areas, i.e., each processing unit corresponds to one split-screen area, and the split-screen areas corresponding to various processing units are different; or that there is a many-to-one correspondence relationship between the processing units and the split-screen areas, i.e., at least two processing units correspond to one split-screen area, and the content to be displayed in the one split-screen area is jointly processed by the at least two processing units. For example, if the display screen includes the first split-screen area and the second split-screen area, at least two processing units jointly process the content to be displayed in the first split-screen area, and at least two processing units jointly process the content to be displayed in the second split-screen area.

S20112, determining the processing units corresponding to each split-screen area based on the split-screen information and the configuration information of the processing units, so as to use the processing units to process the content to be displayed in the corresponding split-screen area.

Corresponding to the embodiments in which the split-screen information includes the size ratio relationship of at least two split-screen areas, process S20112 may include, but is not limited to, the following processes.

S201121, determining the size of each split-screen area based on the size ratio relationship.

S201122, sorting processing capabilities of the various processing units based on the configuration information of the various processing units to obtain a sorting result.

The sorting can include high-to-low sorting or low-to-high sorting.

S201123, determining the processing unit corresponding to each split-screen area based on a condition that the larger the split-screen area, the higher the processing capability of the processing unit needed, the size of each split-screen area, and the sorting result.

For example, the at least two split-screen areas include the first split-screen area and the second split-screen area, and the size ratio relationship of the first split-screen area and the second split-screen area is 3:1. The at least two processing units include dGPU and iGPU, and processing capability of dGPU is higher than that of iGPU. Then it is determined that the processing unit corresponding to the first split-screen area is dGPU, and the processing unit corresponding to the second split-screen area is iGPU.

Processes S201121-S201123 are one implementation manner, and implementation manners of process S20112 are not limited thereto.

S20113, determining the processing units corresponding to each split-screen area based on the split-screen information, the configuration information of the processing units, and the content to be displayed in each split-screen area, so as to use the processing units to process the content to be displayed.

Corresponding to the embodiments in which the split-screen information includes the size ratio relationship of at least two split-screen areas, process S20113 may include, but is not limited to, the following processes.

S201131, determining the size of each split-screen area based on the size ratio relationship.

S201132, sorting the processing capabilities of the various processing units based on the configuration information of the various processing units to obtain a first sorting result.

The sorting can include high-to-low sorting or low-to-high sorting.

S201133, comparing the content to be displayed in various split-screen areas, and determining a second sorting result representing an importance sorting of the content to be displayed in the various split-screen areas.

S201134, determining the processing unit corresponding to each split-screen area based on a condition that the larger the split-screen area and the higher the importance of the content to be displayed, the higher the processing capability of the processing unit needed, the size of each split-screen area, and the first sorting result and the second sorting result.

For example, the at least two split-screen areas include the first split-screen area and the second split-screen area, and the size ratio relationship of the first split-screen area and the second split-screen area is 3:1. The at least two processing units include dGPU and iGPU, and the processing capability of dGPU is higher than that of iGPU. The importance of the content to be displayed in the first split-screen area is higher than the importance of the content to be displayed in the second split-screen area. Then it is determined that the processing unit corresponding to the first split-screen area is dGPU, and the processing unit corresponding to the second split-screen area is iGPU.

Processes S201131-S201134 are one implementation manner, and implementation manners of process S20113 are not limited thereto.

In the present disclosure, it is not limited to determine the processing units corresponding to the split-screen areas based on at least one of the split-screen information of the display screen, the configuration information of the processing units, or the content to be displayed in each split-screen area. The processing units corresponding to the split-screen areas can also be determined based on at least one of screen configuration information of the display screen, display identification information of the split-screen areas fed back by the display controller of the display screen, content source information corresponding to the content to be displayed, display direction, or the type and configuration information of the processing units.

In some embodiments, process S2011 may also include at least one of the following processes.

S20114, obtaining the display identification information of the various split-screen areas fed back from the display controller of the display screen, and adjusting display resolution of the content to be displayed corresponding to the various split-screen areas based on the display identification information.

In some embodiments, the display identification information of the split-screen areas may be used to identify display properties of the split-screen areas. Corresponding to the embodiments in which the display controller is the scalar chip, the display identification information of the split-screen areas may be, but is not limited to, extended display identification data (EDID).

For example, the display properties of the split-screen areas may be identified based on the display identification information, and the display resolution of the content to be displayed corresponding to the various split-screen areas may be adjusted based on the display properties of the split-screen areas. The display properties of the split-screen areas may include, but are not limited to, the display resolution of the split-screen areas.

S20115, after the display screen of the electronic device enters the split-screen mode, configuring relationship between at least two split-screen areas, so as to at least realize data interaction between the at least two split-screen areas.

In some embodiments, the relationship between the at least two split-screen areas can be configured based on user input.

In some other embodiments, the relationship between the at least two split-screen areas can also be automatically configured.

The data interaction between the at least two split-screen areas may include at least one of file data interaction between the at least two split-screen areas, instruction data interaction between the at least two split-screen areas, or display parameter synchronous interaction between the at least two split-screen areas.

S2012, in response to both the first display screen and the second display screen of the electronic device entering a use mode, controlling at least two processing units to display the content to be displayed in the first display screen and the second display screen at least based on first display configuration information of the electronic device.

In some embodiments, controlling at least two processing units to display the content to be displayed in the first display screen and the second display screen at least based on the first display configuration information of the electronic device includes at least one of the following processes.

S20121, determining processing units respectively corresponding to the first display screen and the second display screen based on the first display configuration information, so as to use the various processing units to process the content to be displayed in corresponding display areas.

In process S20121, the first display configuration information is display configuration information related to the first display screen and the second display screen. The first display configuration information may include, but is not limited to, at least one of sizes, resolutions, or types of the first display screen and the second display screen.

In some embodiments, the processing units corresponding to the first display screen and the second display screen may be determined among the at least two processing units at least based on at least one of the sizes, resolutions, or types of the first display screen and the second display screen, and the processing units corresponding to the first display screen and the second display screen may be controlled to process the content to be displayed in the first display screen and the second display screen. For example, the size of the first display screen is 22 inches and the resolution is 1680×1050, and the size of the second display screen is 19 inches and the resolution is 1440×900, then it is determined that the processing unit corresponding to the first display screen is the dGPU with higher processing capability, and the processing unit corresponding to the second display screen is the iGPU with relatively lower processing capacity. The dGPU may include the built-in dGPU in the electronic device, or the external dGPU of the electronic device.

S20122, determining the processing units respectively corresponding to the first display screen and the second display screen based on the first display configuration information and the configuration information of the processing units, so as to use the various processing units to process the content to be displayed in the corresponding display areas.

In some embodiments, the processing units respectively corresponding to the first display screen and the second display screen are determined based on the first display configuration information and the configuration information of the processing units, so that a better adaptation between the processing units and the display areas can be achieved, and the processing units can be effectively used.

Process S20122 may include, but is not limited to, the following processes.

S201221, determining sorting of display configurations of the first display screen and the second display screen based on the first display configuration information to obtain a third sorting result.

The sorting can include high-to-low sorting or low-to-high sorting.

S201222, sorting the processing capabilities of the various processing units based on the configuration information of the various processing units to obtain a fourth sorting result.

The sorting can include high-to-low sorting or low-to-high sorting.

S201223, determining the processing units respectively corresponding to the first display screen and the second display screen based on a condition that the higher the display configuration of the display screen, the higher the processing capability of the processing unit needed, and the third sorting result and the fourth sorting result.

For example, it is determined that the display configuration of the first display screen is higher than that of the second display screen based on the first display configuration information. The at least two processing units of the electronic device include dGPU and iGPU, and the processing capability of the dGPU is higher than that of the iGPU. Then it is determined that the processing unit corresponding to the first display screen is dGPU, and the processing unit corresponding to the second display screen is iGPU.

Processes S201221-S201223 are one implementation manner, and implementation manners of process S20122 are not limited thereto.

S20123, determining the processing units respectively corresponding to the first display screen and the second display screen based on the first display configuration information, the configuration information of the processing units, and the content to be displayed in the first display screen and the second display screen, so as to use the various processing units to process the content to be displayed in the corresponding display areas.

Process S20123 may include, but is not limited to, the following processes.

S201231, determining the sorting of the display configurations of the first display screen and the second display screen based on the first display configuration information to obtain the third sorting result.

The sorting can include high-to-low sorting or low-to-high sorting.

S201232, sorting the processing capabilities of the various processing units based on the configuration information of the various processing units to obtain the fourth sorting result.

The sorting can include high-to-low sorting or low-to-high sorting.

S201233, comparing the content to be displayed in the first display screen and the second display screen, and determining a fifth sorting result representing an importance sorting of the content to be displayed in the first display screen and the second display screen.

S201234, determining the processing units respectively corresponding to the first display screen and the second display screen based on a condition that the higher the display configuration of the display screen and the higher the importance of the content to be displayed, the higher the processing capability of the processing unit needed, and the third sorting result, the fourth sorting result, and the fifth sorting result.

For example, it is determined that the display configuration of the first display screen is higher than that of the second display screen based on the first display configuration information, and an importance of the content to be displayed in the first display screen is higher than an importance of the content to be displayed in the second display screen. The at least two processing units of the electronic device include dGPU and iGPU, and the processing capability of the dGPU is higher than that of the iGPU. Then it is determined that the processing unit corresponding to the first display screen is dGPU, and the processing unit corresponding to the second display screen is iGPU.

Processes S201231-S201234 are one implementation manner, and implementation manners of process S20123 are not limited thereto.

The content to be displayed in the first display screen and the second display screen may also be provided according to scenarios, and the scenarios may include, but are not limited to, scenario one and scenario two described above.

S2013, in response to the electronic device establishing a first communication connection with a first display device, controlling at least two processing units to process the content to be displayed of the electronic device and the first display device at least based on second display configuration information of the electronic device and the first display device.

In process S2013, the second display configuration information of the electronic device or the second display configuration information of the first display device may include, but is not limited to, the sizes, resolutions, and types of the display screens.

The at least two processing units are of the same or different types. For example, when the electronic device has one display screen and the first display device has one display screen, a first dGPU in the electronic device may be controlled to process and control the content to be displayed of the electronic device, and a second dGPU in the electronic device may be controlled to process and control the content to be displayed of the first display device; or that the dGPU in the electronic device may be controlled to process and control the content to be displayed of the electronic device, and the iGPU in the electronic device may be controlled to process and control the content to be displayed of the first display device.

Controlling at least two processing units to process the content to be displayed of the electronic device and the first display device at least based on the second display configuration information of the electronic device and the first display device may include at least one of the following processes.

S20131, when the first display device is configured with the processing units, controlling at least two processing units to process the content to be displayed of the electronic device and controlling the processing units configured at the first display device to process the content to be displayed of the first display device based on the second display configuration information, the processing units configured at the first display device being belong to or not belong to the first display device.

When the first display device is configured with the processing units, the processing units corresponding to the electronic device and the first display device may be determined based on the second display configuration information.

If it is determined that the electronic device corresponds to at least two processing units and that the first display device corresponds to the processing units configured at the first display device based on the second display configuration information, the at least two processing units are controlled to process the content to be displayed of the electronic device and the processing units configured at the first display device are controlled to process the content to be displayed of the first display device.

S20132, when the first display device is configured with the processing units, controlling at least one of the at least two processing units to process the content to be displayed of the electronic device and controlling at least one of the remaining processing units in the at least two processing units and the processing units configured at the first display device to process the content to be displayed of the first display device based on the second display configuration information, the processing units configured at the first display device being belong to or not belong to the first display device.

In some embodiments, when the first display device is configured with the processing units, the processing units corresponding to the electronic device and the first display device may be determined based on the second display configuration information.

If it is determined that the processing units corresponding to the electronic device are at least one of the at least two processing units and that the processing units corresponding to the first display device are at least one of the remaining processing units in the at least two processing units and the processing units configured at the first display device based on the second display configuration information, the at least one of the at least two processing units are controlled to process the content to be displayed of the electronic device and the at least one of the remaining processing units in the at least two processing units and the processing units configured at the first display device are controlled to process the content to be displayed of the first display device.

In some other embodiments, when the first display device is configured with the processing units, it is not limited to determining the processing units corresponding to the electronic device and the first display device based on the second display configuration information. The processing units corresponding to the electronic device and the first display device may also be determined based on at least one of the processing capabilities of the processing units or display quality requirement of the content to be displayed, and the second display configuration information.

S20133, when the first display device is not configured with the processing units, controlling at least one of the at least two processing units to process the content to be displayed of the electronic device and controlling at least one of the remaining processing units in the at least two processing units to process the content to be displayed of the first display device based on the second display configuration information and the processing capabilities of the processing units.

When the first display device is not configured with the processing units, corresponding processing units may be assigned to the electronic device and the first display device from the at least two processing units based on the second display configuration information and the processing capabilities of the processing units, so as to meet requirements to make full use of the processing capabilities of the processing units.

When the corresponding processing units of the electronic device and the first display device are respectively determined, the at least one of the at least two processing units are controlled to process the content to be displayed of the electronic device, and the at least one of the remaining processing units in the at least two processing units are controlled to process the content to be displayed of the first display device.

The processing capabilities of the processing units may be determined based on, but not limited to, the configuration information of the processing units.

Controlling at least two processing units to process the content to be displayed of the electronic device and the first display device based on the second display configuration information of the electronic device and the first display device is one implementation manner. In the present disclosure, it may also be, but is not limited to, that controlling at least two processing units to processes the content to be displayed of the electronic device and the first display device based on at least one of types and display parameters of the content to be displayed, relationship among the content to be displayed, or content sources and display directions corresponding to the content to be displayed, and the second display configuration information of the electronic device and the first display device.

S2014, in response to the display screen of the electronic device entering a screen projection mode, controlling at least two processing units to process the content to be displayed in the first display output area of the display screen and the screen projection area of the screen projection device corresponding to the electronic device at least based on screen projection information of the electronic device.

In process S2014, the content to be displayed in the first display output area of the display screen is consistent with the content to be displayed in the screen projection area of the screen projection device.

The screen projection information of the screen projection device may be at least, but is not limited to be, used to determine number of the screen projection devices corresponding to the electronic device.

For example, at least two processing units may be determined based on the number of the screen projection devices. Each screen projection device corresponds to one processing unit and the display screen of the electronic device corresponds to one processing unit, or that multiple screen projection devices correspond to one processing unit and the display screen of the electronic device corresponds to one processing unit.

Process S202, correspondingly outputting the processing results to the display output area.

In some embodiments, the first target mode with at least two display output areas is entered, and at least two processing units are controlled to process the content to be displayed in the corresponding areas of the at least two display output areas, so as to correspondingly output the processing results to the at least two display output areas by using the corresponding drivers. The processing results are correspondingly output to the display output area. In this way, the at least two processing units of the electronic device are fully utilized to process the content to be displayed in the at least two display output areas, which can reduce the waste of resources of the electronic device, enhance the image output quality and efficiency, avoid the time delay, etc.

Figure 5:
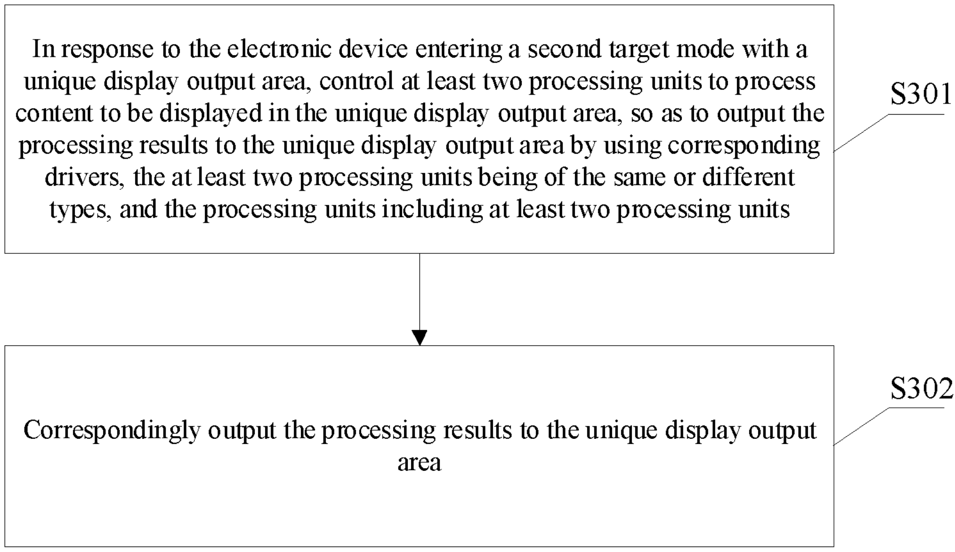
FIG. 5 is a schematic flowchart of a control method according to another example embodiment of the present disclosure.

FIG. 5 is a schematic flowchart of a control method according to another example embodiment of the present disclosure, which is mainly a refinement of the control method described in the above embodiments. As shown in FIG. 5, the method includes but is not limited to the following processes.

Process S301, in response to the electronic device entering a second target mode with a unique display output area, controlling at least two processing units to process the content to be displayed in the unique display output area, so as to output the processing results to the unique display output area by using corresponding drivers, the at least two processing units being of the same or different types, and the processing units including at least two processing units.

The processing units may or may not belong to the electronic device.

In response to the electronic device entering the second target mode with the unique display output area, the processing units corresponding to the unique display output area may be selected from the at least two processing units.

In some embodiments, the electronic device may enter the second target mode with the unique display output area from power-on. In some other embodiments, the electronic device may enter the second target mode with the unique display output area from the first target mode with at least two display output areas.

The processing units in the on state may be the same or different when the electronic device enters from power-on or the first target mode with at least two display output areas into the second target mode with the unique display output area. For example, if the at least two processing units are both turned on when starting up, when the electronic device enters from power-on into the second target mode with the unique display output area, one of the at least two processing units can be turned off, and the remaining processing units that are turned on correspond to the unique display output area. When the electronic device enters from power-on into the second target mode with the unique display output area, it may also be that the at least two processing units are kept on, and the at least two processing units correspond to the unique display output area, where the at least two processing units can process the content to be displayed in the unique display output area in parallel or in serial.

If the at least two processing units are turned on in the first target mode, when the electronic device enters from the first target mode into the second target mode, one of the at least two processing units can be turned off, and the remaining processing units that are turned on correspond to the unique display output area.

Process S302, correspondingly outputting the processing results to the unique display output area.

In some embodiments, in response to the electronic device entering the second target mode with the unique display output area, at least two processing units are controlled to process the content to be displayed in the unique display output area, so as to output the processing results to the unique display output area by using the corresponding drivers. In this way, the at least two processing units of the electronic device are fully utilized to process the content to be displayed in the unique display output area, which can reduce the waste of resources of the electronic device.

Process S101 in the above embodiments is not limited to include process S201 or process S301 described above, and the process S101 may also include the process S201 and process S301.

Figure 6:
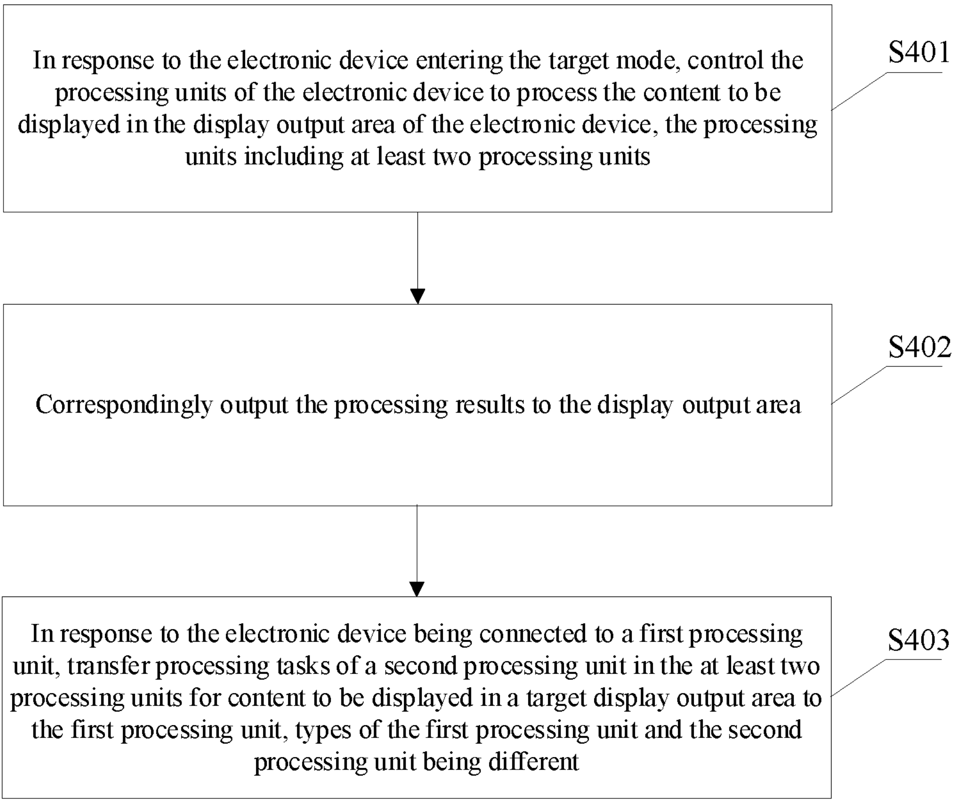
FIG. 6 is a schematic flowchart of a control method according to another example embodiment of the present disclosure.

FIG. 6 is a schematic flowchart of a control method according to another example embodiment of the present disclosure, which is mainly an extension of the control method described in the above embodiments. As shown in FIG. 6, the method includes but is not limited to the following processes.

Process S401, in response to the electronic device entering the target mode, controlling the processing units of the electronic device to process the content to be displayed in the display output area of the electronic device, the processing units including at least two processing units.

The processing units may or may not belong to the electronic device, and the display output area may or may not be unique.

Process S402, correspondingly outputting the processing results to the display output area.

As for details of processes S401 and S402, reference may be made to the relevant description of processes S101 and S102 in the above embodiments, which will not be repeated herein.

Process S403, in response to the electronic device being connected to a first processing unit, transferring processing tasks of a second processing unit in the at least two processing units for content to be displayed in a target display output area to the first processing unit, types of the first processing unit and the second processing unit being different.

Figure 7:
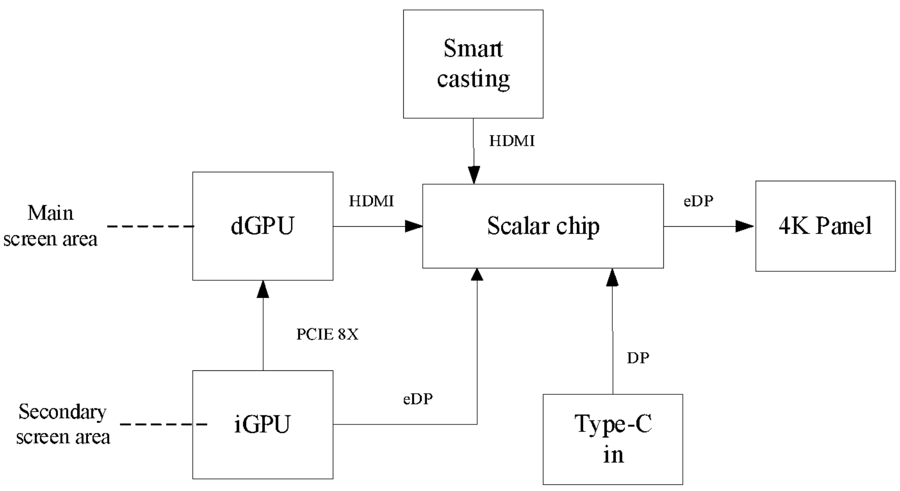
FIG. 7 is a schematic diagram showing an implementation scenario of a control method according to another example embodiment of the present disclosure.

In some embodiments, the electronic device may have the external interface, and the display controller may determine that the external interface switches from the first state to a second state. It is determined that the electronic device is connected to the first processing unit, and the second processing unit in the at least two processing units corresponding to the target display output area is switched to the first processing unit, where the types of the first processing unit and the second processing unit are different. For example, as shown in part (a) of FIG. 7, if the display screen of the electronic device is split into the main screen area and the secondary screen area, the processing unit corresponding to the main screen area is the built-in dGPU of the electronic device, and the second processing unit corresponding to the secondary screen area is the iGPU. The iGPU processes the content to be displayed in the secondary screen area, and the built-in dGPU processes the content to be displayed in the main screen area. As shown in part (b) of FIG. 7, if the electronic device is connected to the first processing unit, i.e., the external dGPU, processing tasks of the iGPU for the content to be displayed in the secondary screen area are transferred to the external dGPU, and the external dGPU and the iGPU respectively use the drivers to send the processing results to the scalar chip. The scalar chip decodes the processing results, and the display driver drives the display circuit corresponding to the display output area to display the decoded content (such as 4 k panel).

A control apparatus provided by the present disclosure will be described below, and the control apparatus described below and the control method described above can be referred to in correspondence.

The control apparatus includes a control module and an output module.

The control module is configured to, in response to the electronic device entering the target mode, control the processing units of the electronic device to process the content to be displayed in the display output area of the electronic device, the processing units including at least two processing units.

The output module is configured to correspondingly output the processing results to the display output area.

The processing units may or may not belong to the electronic device, and the display output area may or may not be unique.

A process that the control module controls the processing units of the electronic device to process the content to be displayed in the display output area of the electronic device in response to the electronic device entering the target mode may include at least one of the following processes.

In response to the electronic device entering the first target mode with at least two display output areas, at least two processing units are controlled to process the content to be displayed in the corresponding areas of the at least two display output areas, so as to correspondingly output the processing results to the at least two display output areas by using corresponding drivers. The at least two processing units are of the same or different types.

In response to the electronic device entering the second target mode with the unique display output area, at least two processing units are controlled to process the content to be displayed in the unique display output area, so as to output the processing results to the unique display output area by using corresponding drivers. The at least two processing units are of the same or different types.

A process that the control module controls at least two processing units to process the content to be displayed in the corresponding areas of the at least two display output areas in response to the electronic device entering the first target mode with at least two display output areas may include at least one of the following processes.

In response to the display screen of the electronic device entering the split-screen mode, at least two processing units are controlled to process the content to be displayed in corresponding areas in at least two split-screen areas at least based on the split-screen information of the display screen.

In response to both the first display screen and the second display screen of the electronic device entering the use mode, at least two processing units are controlled to display the content to be displayed in the first display screen and the second display screen at least based on the first display configuration information of the electronic device.

In response to the electronic device establishing the first communication connection with the first display device, at least two processing units are controlled to process the content to be displayed of the electronic device and the first display device at least based on the second display configuration information of the electronic device and the first display device.

A process that the control module controls at least two processing units to process the content to be displayed in corresponding areas in at least two split-screen areas at least based on the split-screen information of the display screen may include at least one of the following processes.

The processing units corresponding to each split-screen area are determined based on the split-screen information, so as to use the processing units to process the content to be displayed in the corresponding split-screen area.

The processing units corresponding to each split-screen area are determined based on the split-screen information and the configuration information of the processing units, so as to use the processing units to process the content to be displayed in the corresponding split-screen area.

The processing units corresponding to each split-screen area are determined based on the split-screen information, the configuration information of the processing units, and the content to be displayed in each split-screen area, so as to use the processing units to process the content to be displayed.

A process that the control module controls at least two processing units to process the content to be displayed in the corresponding areas of the at least two display output areas in response to the electronic device entering the first target mode with at least two display output areas may also include at least one of the following processes.

The display identification information of the various split-screen areas fed back from the display controller of the display screen are obtained, and the display resolution of the content to be displayed corresponding to the various split-screen areas are adjusted based on the display identification information.

After the display screen of the electronic device enters the split-screen mode, the relationship between at least two split-screen areas are configured, so as to at least realize the data interaction between the at least two split-screen areas.

A process that the control module controls at least two processing units to display the content to be displayed in the first display screen and the second display screen at least based on the first display configuration information of the electronic device may include at least one of the following processes.

The processing units respectively corresponding to the first display screen and the second display screen are determined based on the first display configuration information, so as to use the various processing units to process the content to be displayed in the corresponding display areas.

The processing units respectively corresponding to the first display screen and the second display screen are determined based on the first display configuration information and the configuration information of the processing units, so as to use the various processing units to process the content to be displayed in the corresponding display areas.

The processing units respectively corresponding to the first display screen and the second display screen are determined based on the first display configuration information, the configuration information of the processing units, and the content to be displayed in the first display screen and the second display screen, so as to use the various processing units to process the content to be displayed in the corresponding display areas.

A process that the control module controls at least two processing units to process the content to be displayed of the electronic device and the first display device at least based on the second display configuration information of the electronic device and the first display device may include at least one of the following processes.

When the first display device is configured with the processing units, at least two processing units are controlled to process the content to be displayed of the electronic device and the processing units configured at the first display device are controlled to process the content to be displayed of the first display device based on the second display configuration information, the processing units configured at the first display device being belong to or not belong to the first display device.

When the first display device is configured with the processing units, at least one of the at least two processing units are controlled to process the content to be displayed of the electronic device and at least one of the remaining processing units in the at least two processing units and the processing units configured at the first display device are controlled to process the content to be displayed of the first display device based on the second display configuration information, the processing units configured at the first display device being belong to or not belong to the first display device.

When the first display device is not configured with the processing units, at least one of the at least two processing units are controlled to process the content to be displayed of the electronic device and at least one of the remaining processing units in the at least two processing units are controlled to process the content to be displayed of the first display device based on the second display configuration information and the processing capabilities of the processing units.

The control module may also be configured to, in response to the electronic device being connected to the first processing unit, transfer the processing tasks of the second processing unit in the at least two processing units for the content to be displayed in the target display output area to the first processing unit, the types of the first processing unit and the second processing unit being different.

Corresponding to the control method provided by the present disclosure, an electronic device to which the control method is applied is also provided by the present disclosure.

Figure 8:
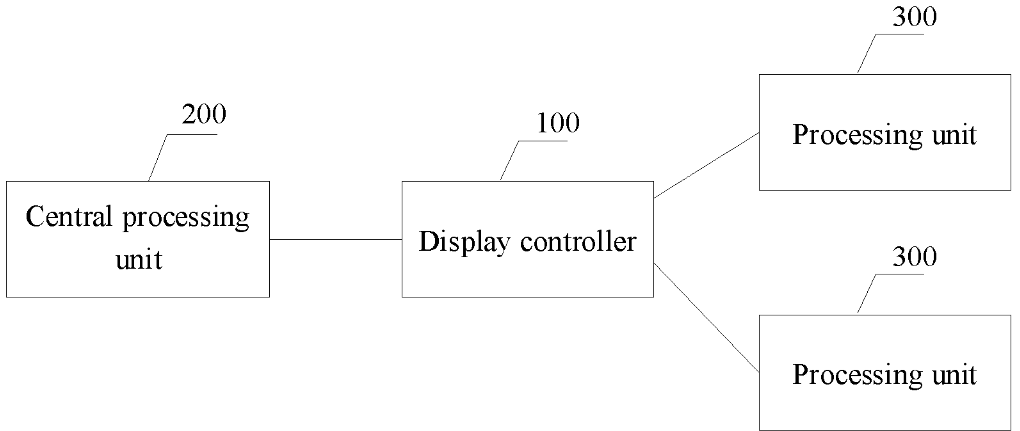
FIG. 8 is a schematic structural diagram of an electronic device according to an embodiment of the present disclosure.

As shown in FIG. 8, the electronic device includes a display controller 100, a central processing unit 200, and at least two processing units 300.

The display controller 100 is configured to determine the processing units 300 corresponding to the display output area of the electronic device in response to the electronic device entering the target mode.

The central processing unit 200 is configured to send the content to be displayed in the display output area to the processing units 300 corresponding to the display output area.

The processing units 300 are configured to process the content to be displayed, and send the processing results to the display controller 100.

The display controller 100 is also configured to correspondingly output the processing results to the display output area.

The processing units 300 may or may not belong to the electronic device, and the display output area may or may not be unique.

Each embodiment focuses on the differences from other embodiments, and for the same or similar parts between the various embodiments, reference can be made to each other. For the apparatuses disclosed in the embodiments, since they are basically similar to the methods disclosed in the embodiments, the descriptions are relatively simple, and as for relevant information, reference can be made to the descriptions of the methods.

Relational terms such as first and second are only used herein to distinguish one entity or operation from another entity or operation, and do not necessarily require or imply any such actual relationship or order between these entities or operations. The terms "include," "involve" or any other variations thereof are intended to cover non-exclusive inclusion, so that a process, method, object, or device including a series of elements not only includes those elements, but also includes other elements that are not explicitly listed, or also includes elements inherent to such processes, method, object, or device. Without further restrictions, the element associated with phrase "including a . . . " does not exclude the existence of other identical elements in the process, method, object, or device that includes the element.

For ease of description, when the above apparatus is described, functions are divided into various modules and described separately. The functions of each module can be implemented in one or more software and/or hardware when the present disclosure is implemented.

According to the description of the above embodiments, those skilled in the art can clearly understand that the present disclosure can be implemented in manners of software plus a necessary general hardware platform. Based on this understanding, an essence of the technical solutions of the present disclosure or a part that contributes to the existing technology can be embodied in forms of software products. The computer software products can be stored in a storage medium, such as a ROM/RAM, a disk, an optical disc, etc., including several instructions to cause a computer device (which may be a personal computer, a server, a network device, etc.) to execute the method or some parts of the method consistent with the present disclosure.

A control method, an apparatus, and an electronic device consistent with the present disclosure have been described in detail above. In this specification, some examples are used to illustrate the principle and implementation manners of the present disclosure. The description of the above embodiments is only used to help understand the method consistent with the present disclosure and core idea hereof. Meanwhile, for those skilled in the art, based on the idea of the present disclosure, there will be changes in the implementation manners and application scope. In summary, the content of this specification should not be construed as a limitation of the present disclosure.

What is claimed is:

1. A control method comprising:

identifying at least two processing units;

in response to the electronic device entering different target modes, controlling at least two processing units of the electronic device to process display content for one or more display output areas based on control parameters corresponding to each target mode to obtain processing results by a display controller of an electronic device, including:

based on display configuration information of the electronic device and configuration information of the processing units, determining a processing unit for each display output area of the one or more display output areas to allow the processing unit to process a to-be-displayed content of the corresponding display output area, the display configuration information including at least one of a size ratio relationship of the display output areas, resolutions, or types, and the configuration information of the processing units representing processing capabilities of the processing units, including:

determining the processing unit corresponding to each display output area based on a condition that the higher the display configuration information of the corresponding display output area, the higher the processing capability of the processing unit needed;

receiving, by the display controller, the processing results obtained by the at least two processing units processing the display content; and outputting, by the display controller, the processing results to the one or more display output areas.

2. The method of claim 1, wherein controlling the at least two processing units to process the display content in response to the electronic device entering the different target modes includes at least one of:

in response to the electronic device entering a first target mode with at least two display output areas, controlling the at least two processing units to process content, that is to be displayed in corresponding ones of the at least two display output areas, so as to output the processing results to the at least two display output areas using corresponding drivers; or in response to the electronic device entering a second target mode with only one display output area, controlling the at least two processing units to process content, that is to be displayed in the only one display output area, so as to output the processing results to the only one display output area using the corresponding drivers.

3. The method of claim 2, wherein controlling the at least two processing units to process the content, that is to be displayed in the corresponding ones of the at least two display output areas, in response to the electronic device entering the first target mode with the at least two display output areas includes at least one of:

in response to a display screen of the electronic device entering a split-screen mode, controlling the at least two processing units to process content, that is to be displayed in at least two split-screen areas, at least based on split-screen information of the display screen;

in response to both a first display screen and a second display screen entering a use mode, controlling the at least two processing units to process content, that is to be displayed in the first display screen and the second display screen, at least based on first display configuration information of the electronic device; or in response to the electronic device establishing a communication connection with a display device, controlling the at least two processing units to process content, that is to be displayed, of the electronic device and the display device at least based on second display configuration information of the electronic device and the display device.

4. The method of claim 3, wherein controlling the at least two processing units to process the content, that is to be displayed in the at least two split-screen areas, at least based on the split-screen information of the display screen includes at least one of:

for each of the at least two split-screen areas, determining a corresponding one of the at least two processing units based on the split-screen information, so as to use the determined processing unit to process the content, that is to be displayed in the split-screen area;

for each of the at least two split-screen areas, determining a corresponding one of the at least two processing units based on the split-screen information and the configuration information of the at least two processing units, so as to use the determined processing unit to process the content, that is to be displayed in the split-screen area; or for each of the at least two split-screen areas, determining a corresponding one of the at least two processing units based on the split-screen information, the configuration information of the at least two processing units, and the content to be displayed in the split-screen area, so as to use the determined processing unit to process the corresponding content to be displayed.

5. The method of claim 4, further comprising at least one of:

for each of the at least two split-screen areas, obtaining display identification information of the split-screen area fed back from a display controller of the display screen, and adjusting display resolution of the content to be displayed corresponding to the split-screen area based on the display identification information; or after the display screen of the electronic device enters the split-screen mode, configuring relationship between the at least two split-screen areas, so as to at least realize data interaction between the at least two split-screen areas.

6. The method of claim 3, wherein controlling the at least two processing units to process the content, that is to be displayed in the first display screen and the second display screen, at least based on the first display configuration information of the electronic device includes at least one of:

for each of the first display screen and the second display screen, determining a corresponding one of the at least two processing units based on the first display configuration information, so as to use the determined processing unit to process the content, that is to be displayed in the display screen;

for each of the first display screen and the second display screen, determining a corresponding one of the at least two processing units based on the first display configuration information and the configuration information of the at least two processing units, so as to use the determined processing unit to process the content, that is to be displayed in the display screen; or for each of the first display screen and the second display screen, determining a corresponding one of the at least two processing units based on the first display configuration information, the configuration information of the at least two processing units, and the content to be displayed in the first display screen and the second display screen, so as to use the determined processing unit to process the content, that is to be displayed in the display screen.

7. The method of claim 3, wherein controlling the at least two processing units to process the content, that is to be displayed, of the electronic device and the display device at least based on the second display configuration information of the electronic device and the display device includes at least one of:

in response to the display device being configured with a processing unit, controlling the at least two processing units to process the content, that is to be displayed, of the electronic device and controlling the processing unit configured at the display device to process the content, that is to be displayed of the display device, based on the second display configuration information;

in response to the display device being configured with the processing unit, controlling at least one of the at least two processing units to process the content, that is to be displayed, of the electronic device and controlling at least one of remaining processing units in the at least two processing units and the processing unit configured at the display device to process the content, that is to be displayed, of the display device based on the second display configuration information; and in response to the display device being not configured with processing unit, controlling at least one of the at least two processing units to process the content, that is to be displayed, of the electronic device and controlling at least one of remaining processing units in the at least two processing units to process the content, that is to be displayed, of the display device based on the second display configuration information and the processing capabilities of the at least two processing units.

8. The method of claim 1, further comprising:

in response to the electronic device being connected to a first processing unit, transferring a processing task of a second processing unit in the at least two processing units for content to be displayed in a target display output area to the first processing unit, types of the first processing unit and the second processing unit being different.

9. An electronic device comprising:

a display controller configured to determine at least two processing units, wherein each of the at least two processing units having at least one display processing function to process display content to be displayed in corresponding areas in one or more display output areas of the electronic device in response to the electronic device entering different target modes wherein the two processing units process display content based on control parameters corresponding to each target mode, wherein:

the target modes include a first target mode and a second target mode;

in response to the electronic device entering the first target mode with at least two display output areas in response to a trigger event, a processing unit corresponding to each of the at least two display output areas is determined from the at least two processing units; and in response to the electronic device entering the second target mode with one display output area from power-on or the first target mode, one of the at least two processing units is turned off, and remaining processing units correspond to the display output area; and a central processing unit configured to send display content for the one or more display output areas to the at least two processing units;

wherein the display controller is further configured to:

receive processing results obtained by the at least two processing units processing the display content; and output the processing results to the one or more display output areas.

10. The electronic device of claim 9, wherein the display controller is further configured to perform at least one of:

in response to the electronic device entering the first target mode with at least two display output areas, controlling the at least two processing units to process content, that is to be displayed in corresponding ones of the at least two display output areas, so as to output the processing results to the at least two display output areas using corresponding drivers; or in response to the electronic device entering the second target mode with only one display output area, controlling the at least two processing units to process content, that is to be displayed in the only one display output area, so as to output the processing results to the only one display output area using the corresponding drivers.

11. The electronic device of claim 10, wherein the display controller is further configured to perform at least one of:

in response to a display screen of the electronic device entering a split-screen mode, controlling the at least two processing units to process content, that is to be displayed in at least two split-screen areas, at least based on split-screen information of the display screen;

in response to both a first display screen and a second display screen entering a use mode, controlling the at least two processing units to process content, that is to be displayed in the first display screen and the second display screen, at least based on first display configuration information of the electronic device; or in response to the electronic device establishing a communication connection with a display device, controlling the at least two processing units to process content, that is to be displayed, of the electronic device and the display device at least based on second display configuration information of the electronic device and the display device.

12. The electronic device of claim 11, wherein the display controller is further configured to perform at least one of:

for each of the at least two split-screen areas, determining a corresponding one of the at least two processing units based on the split-screen information, so as to use the determined processing unit to process the content, that is to be displayed in the split-screen area;

for each of the at least two split-screen areas, determining a corresponding one of the at least two processing units based on the split-screen information and configuration information of the at least two processing units, so as to use the determined processing unit to process the content, that is to be displayed in the split-screen area; or for each of the at least two split-screen areas, determining a corresponding one of the at least two processing units based on the split-screen information, the configuration information of the at least two processing units, and the content, that is to be displayed in the split-screen area, so as to use the determined processing unit to process the corresponding content to be displayed.

13. The electronic device of claim 12, wherein the display controller is further configured to perform at least one of:

for each of the at least two split-screen areas, obtaining display identification information of the split-screen area fed back from a display controller of the display screen, and adjusting display resolution of the content to be displayed corresponding to the split-screen area based on the display identification information; or after the display screen of the electronic device enters the split-screen mode, configuring relationship between the at least two split-screen areas, so as to at least realize data interaction between the at least two split-screen areas.

14. The electronic device of claim 11, wherein the display controller is further configured to perform at least one of:

for each of the first display screen and the second display screen, determining a corresponding one of the at least two processing units based on the first display configuration information, so as to use the determined processing unit to process the content, that is to be displayed in the display screen;

for each of the first display screen and the second display screen, determining a corresponding one of the at least two processing units based on the first display configuration information and configuration information of the at least two processing units, so as to use the determined processing unit to process the content, that is to be displayed in the display screen; or for each of the first display screen and the second display screen, determining a corresponding one of the at least two processing units based on the first display configuration information, the configuration information of the at least two processing units, and the content to be displayed in the first display screen and the second display screen, so as to use the determined processing unit to process the content, that is to be displayed in the display screen.

15. The electronic device of claim 11, wherein the display controller is further configured to perform at least one of:

in response to the display device being configured with a processing unit, controlling the at least two processing units to process the content, that is to be displayed, of the electronic device and controlling the processing unit configured at the display device to process the content, that is to be displayed, of the display device based on the second display configuration information;

in response to the display device being configured with the processing unit, controlling at least one of the at least two processing units to process the content, that is to be displayed, of the electronic device and controlling at least one of remaining processing units in the at least two processing units and the processing unit configured at the display device to process the content, that is to be displayed, of the display device based on the second display configuration information; and in response to the display device being not configured with processing unit, controlling at least one of the at least two processing units to process the content, that is to be displayed, of the electronic device and controlling at least one of remaining processing units in the at least two processing units to process the content, that is to be displayed, of the display device based on the second display configuration information and processing capabilities of the at least two processing units.

16. The electronic device of claim 9, wherein the display controller is further configured to perform:

in response to the electronic device being connected to a first processing unit, transferring a processing task of a second processing unit in the at least two processing units for content to be displayed in a target display output area to the first processing unit, types of the first processing unit and the second processing unit being different.

* * * * *